United States Patent [19]
Machmer

[11] 3,794,417
[45] Feb. 26, 1974

[54] HIGH SPEED PRINTING SYSTEM WITH HEATED ROLL FUSER

[75] Inventor: James Andrew Machmer, Lexington, Ky.

[73] Assignee: International Business Machines Corporation, Armonk, N.Y.

[22] Filed: Dec. 21, 1972

[21] Appl. No.: 317,482

[52] U.S. Cl............... 355/3, 219/388, 271/57, 271/76, 355/14
[51] Int. Cl............................................. G03g 15/00
[58] Field of Search............. 355/3, 14; 271/76, 79; 219/388

[56] References Cited
UNITED STATES PATENTS

| | | | |
|---|---|---|---|
| 3,481,589 | 12/1969 | Cely et al. | 219/388 |
| 3,291,466 | 12/1966 | Aser et al. | 219/388 |
| 3,449,548 | 6/1969 | Adamek et al. | 219/388 |
| 3,507,489 | 4/1970 | Wilshin et al. | 271/76 |
| 2,852,256 | 9/1958 | Faulls et al. | 271/76 |

Primary Examiner—Richard L. Moses
Attorney, Agent, or Firm—E. Ronald Coffman

[57] ABSTRACT

Thermoplastic powder images delivered in succession from the transfer station of a copy machine or the equivalent station of another electrostatic printer at a high rate of speed are fixed to a support sheet by heat and pressure in a substantially slower moving fusing roll couple. This differential speed enables the operation of the fusing roll couple at lower temperatures and pressures to make practical the use of an internally heated fusing roll having a deformable surface. The speed of the fusing roll couple is perferably selected to substantially eliminate the space between successively delivered copies such that the rolls of the roll couple need not be separated between successive copies. A conveyor that transports copies to the roll couple is preferably driven with a programmed speed to match the speed at which a copy is generated and to alternately match the slower speed of the fusing roll couple as the copy is introduced thereto.

14 Claims, 17 Drawing Figures

PATENTED FEB 26 1974 3,794,417
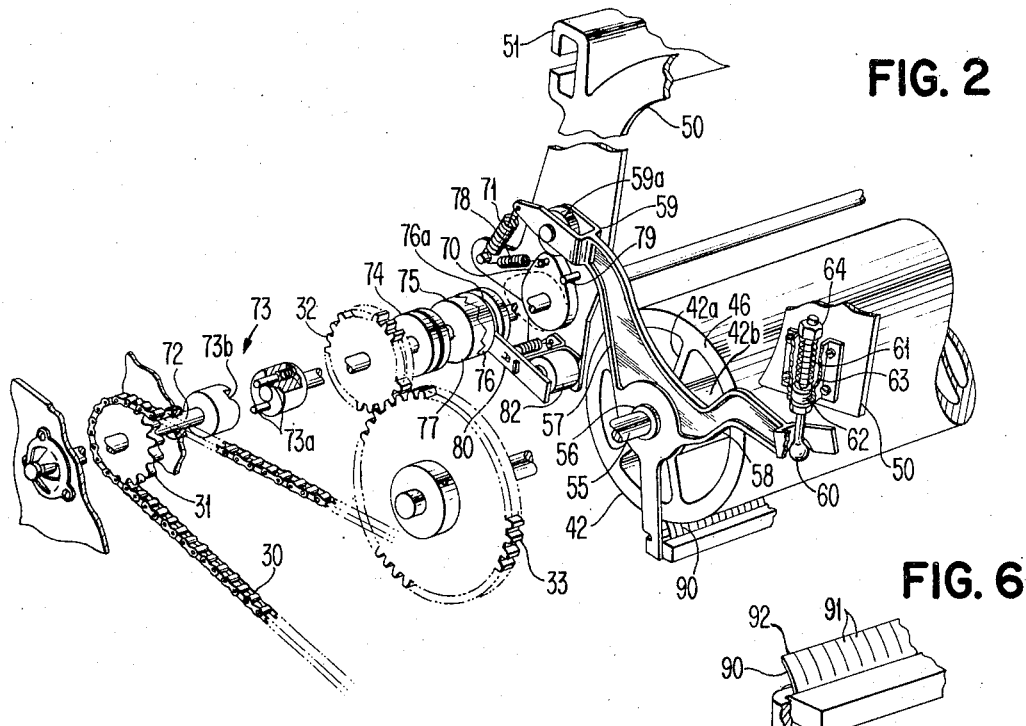
FIG. 2
FIG. 6
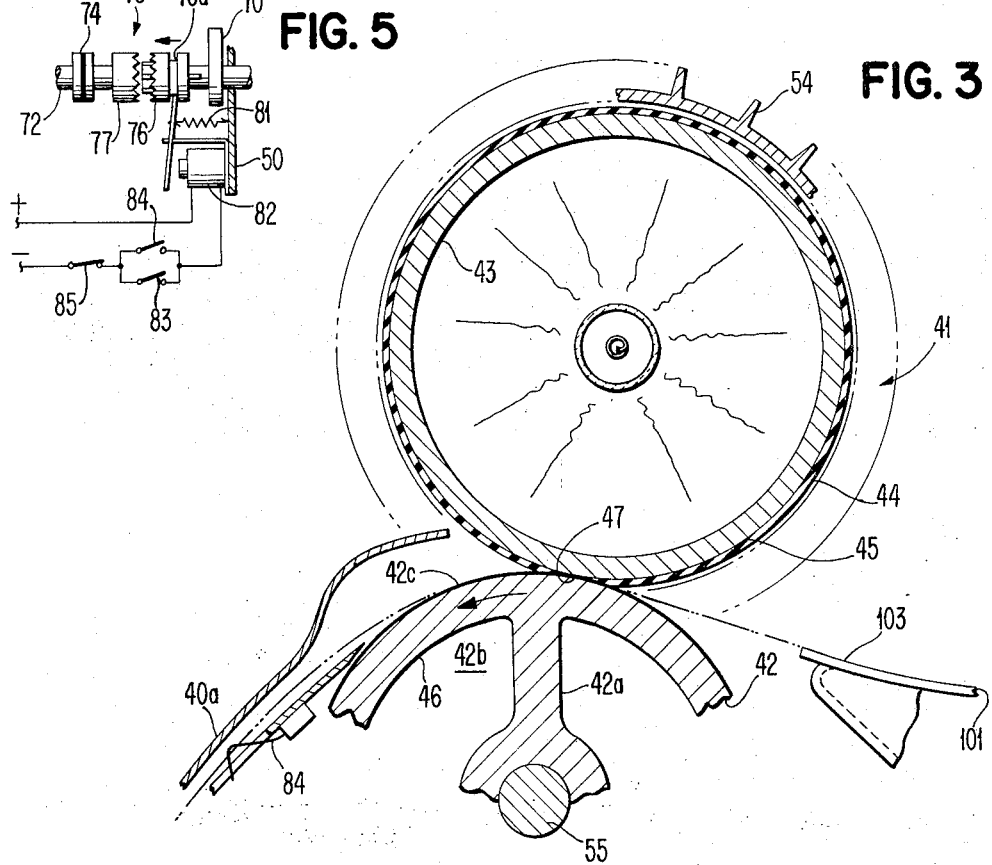
FIG. 5
FIG. 3

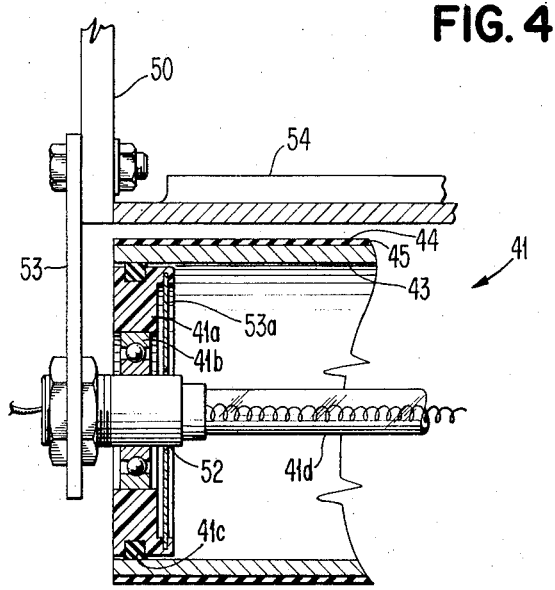
FIG. 4
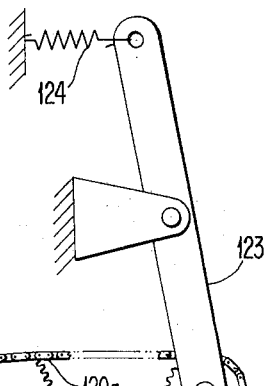
FIG. 8a
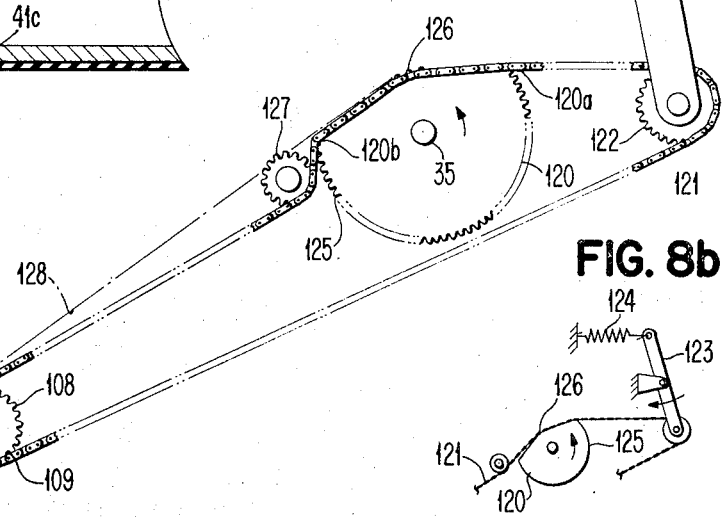
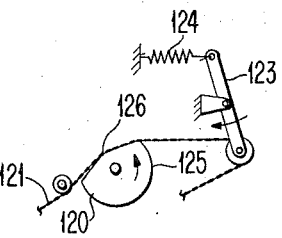
FIG. 8b
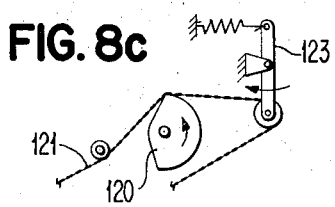
FIG. 8c
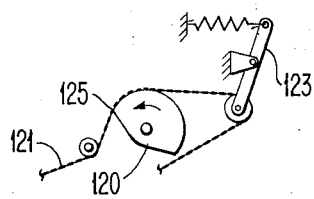
FIG. 8d
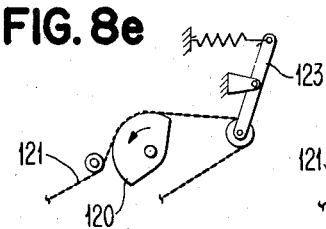
FIG. 8e
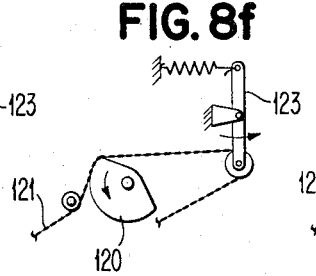
FIG. 8f   FIG. 8g

HIGH SPEED PRINTING SYSTEM WITH HEATED ROLL FUSER

BACKGROUND OF THE INVENTION

Roll fusers for fixing thermoplastic powder images such as those produced by a xerographic copier are known to be quite efficient in the application of fusing heat relative to other thermal fusing methods. Known techniques of roll fuser design indicate the desirability of providing a heat source internal of the fusing roll to minimize heat loss, of providing a deformable surface on the fusing roll to minimize sticking of fused copy thereto, and of maximizing the footprint or impression made by the backup roll into the deformable surface of the fuser roll to maximize time for heat transfer. Also, good roll fuser design is known to include the use of a cool and clean backup roll to minimize soiling copy with toner from the backup roll. In extreme cases, toner on the backup roll can cause copy to stick thereto. A cool and clean backup roll also is necessary for proper fixing of an image to the reverse side of a support sheet bearing a previously fixed image, i.e., in so-called "duplex" copying.

It will be recognized by those skilled in the art that the various design techniques indicated as desirable for a roll fuser are in many instances mutually conflicting. For example, the deformable wall material desirable for the hot roll to provide the best separation of copy therefrom conflicts with the criteria necessary to achieve best heat transfer through the hot roll wall from an internal heater. These indicated design criteria in many cases become more critical with increased processing speed. For example, to transfer heat at a faster rate for faster operating speed, it is necessary to increase the temperature applied to the internal hot roll cylinder wall. This higher temperature applied to the roll surface material can more rapidly degrade its structural and surface properties thus limiting the selection of useful materials to those capable of high temperature operation. The high temperature materials on the other hand may have less than the best structural and surface properties. While poor heat transfer efficiency can be compensated for by increasing the hot roll diameter to increase temperature recovery time, this technique conflicts with a basic desire for system compactness.

When copies are made on cut sheet paper, an inter-copy gap is ordinarily present between successive copies. This gap may be due to the time required for a scanning system to return home or it may be due to the configuration of the copy drum wherein copies are made only from a certain pre-determined portion of its periphery. This inter-copy gap provides a time period when the fusing roll is in direct contact with the backup roll which is desired to be maintained cool and clean. Apparatus can be provided to automatically separate the fusing and backup rolls during the inter-copy gap. Such provision, however, introduces both mechanical complexity and noise.

While it is known, for example, to operate a non-contact fusing station at lesser relative speed than the speed of copy production, see U. S. Pat. No. 3,481,589, I am not aware of any application of the concept of the enhancement of contact fusers. Upon this background, it has been an object of my invention to provide a printing system for delivering cut sheet copies and including a roll fuser wherein the cut sheet copies are presented to the roll fuser without a substantial inter-copy gap therebetween.

Another object of my invention has been to provide a high speed printing system with relaxed operating parameters for a roll fuser associated therewith.

A further object of my invention has been to take advantage of the time made available by the inherent inter-copy gap between successively produced copy sheets to reduce the linear speed of a roll fuser operating to fix images to these copy sheets.

Still another object of my invention has been to eliminate the need to separate the rolls of a fusing roll couple between successive copies by eliminating the inherent intercopy gap therebetween.

Still a further object of my invention has been to devise and develop a specific copy sheet transport conveyor having programmed motion whereby its speed is matched with copy transfer speed throughout the transfer operation and thereafter its speed is reduced to match the speed of a roll fuser when introducing the leading edge of a copy thereinto.

DISCLOSURE OF THE INVENTION

The printing system of my invention operates a heated roll fuser at a slower linear feed rate than the rate at which copies are generated. The slower rate of the fuser uses time otherwise wasted by the printing system due to the inherent gap between successively produced copies. While the first copy produced by my system will be retarded slightly by the slower fuser speed, successive copies will be delivered at the same copy per minute rate as would be true without my slower fusing roll speed.

Preferably the differential speed between the roll fuser and the copy generating mechanism is such that the inter-copy gap is substantially eliminated. However, for safe tolerancing of an actual system, the design should provide for some slight minimum gap simply to prevent the possibility of edge overlap between the copies. In accordance with this preferred embodiment, the relationship of the fuser speed to the copy generating speed is of substantially the same proportion as is the relationship of the length of paper to be fused to the sum of the length of paper and length of inter-copy gap. In other words, the fuser should be capable of feeding an entire copy sheet in substantially the same time as the copy generating mechanism feeds the copy sheet and transverses the inter-copy gap. The tolerance consideration mentioned above simply requires the addition of a small fixed distance to the paper length to insure no overlap between successive copies. By substantially eliminating the inter-copy gap, a maximum amount of slowing is accomplished and also the need to separate the fusing rolls to prevent heating of the backup roll during the inter-copy gap is eliminated. By reducing the operating speed of the fusing roll it becomes possible to have a high speed copy sysetm that employs a fusing roll with a small diameter, a deformable surface and internal heating.

With internal heating, all heat available for fusing at the roll surface must be conducted through the fuser roll wall. The ease of heat conduction through the wall determines the applied temperatures that the components must withstand and the roll diameter required to provide time for the roll surface to be reheated after giving up heat during a fusing pass. The materials suitable for providing the deformable surface of the fuser roll wall, such as silicone polymers and elastomers, have only fair heat conducting properties. Thus to obtain an efficient heat conducting path, it is necessary to limit the thickness of the deformable surface. The residence time of copy against the fusing roll surface determines the quantity of heat delivered for fusing the copy. This residence time is controlled by the size of a footprint or impression made by the backup roll in the deformable surface of the fusing roll and the peripheral velocity of the fuser rolls. A relatively thin deformable surface layer limits the total size of the footprint and also increases the force and attendant stresses required to develop footprint of any given size. Thus, it is not possible to obtain increased heat flow by increasing the residence time through increasing the footprint beyond a relatively small limit.

Increasing the roll diameter or the internally applied temperatures are both undesirable from the standpoint of compactness and materials stability respectively. By making the time that is normally wasted during the inter-copy gap available as residence time of copy in the roll fuser, I have significantly relaxed the requirements for heat flow through the deformable surface thereby allowing a more optimum selection of surface materials by reducing the required operating temperature and impression loading. Since the time employed otherwise was wasted, my system does not interfere with the rate at which successive copies are produced.

Copies can be transported between the copy generating mechanism and the roll fuser in many ways. The particular type of transport required depends upon the geometrical configuration of the machine. A very simple conveyor may be appropriate where the fusing station is below the copy generating mechanism thus allowing gravity feed with only a minimum of structural assistance. On the other hand, if the copy is to be transported upwardly, it becomes necessary to more positively grip the copy as by a vacuum conveyor. Depending upon the tenacity of an unfused image to a copy sheet and the relative difference in speed of the copy generating mechanism and the fuser, it is sometimes possible to simply introduce unfused copy at its production speed to the slower roll fuser.

Still another option is to slow the copy to substantially the roll fuser speed at least during the time that the leading edge of the copy is being first introduced to the roll fuser. This is accomplished through a belt conveyor with a vacuum hold down assist and a drive motion program whereby the belts are driven at the copy production speed to receive copy without disturbing the transfer process. As the leading edge of the copy approaches the roll fuser, the speed of the belts is abruptly slowed to approximately that of the fuser. After the leading edge of the copy is received by the roll fuser, the belt is again brought up to the speed of the copy generating mechanism for receipt of the next copy. I have found that the paper being fed in the roll fuser will remain flat and will simply slip on the fuser transport belts as they move at the faster copy production speed. The appropriate motion program is conveniently provided by a profiled sprocket pulley and that converts fixed angular motion from a source that is synchronized with the copy system into the different speeds required.

These and other objects, features, and advantages of my invention will be apparent to those skilled in the art upon reading and understanding the following more specific descriptions of some preferred illustrative embodiments wherein reference is made to the accompanying drawings, of which:

FIG. 2 is a fragmental perspective view of fuser drive mechanism employed in the system of FIG. 1.

FIG. 3 is an enlarged side cross-sectional view of the roll fuser employed in the printing system of FIG. 1.

FIG. 4 is a fragmental front cross-sectional view of the roll fuser shown in FIGS. 1 and 3.

FIG. 5 is a fragmental plan view of certain control details of the roll fuser shown in FIG. 2.

FIG. 6 is an enlarged fragmental perspective view of a scraper shown in FIG. 2.

FIG. 7 is a fragmental plan view of a portion of a conveyor employed in the printing system of FIG. 1 and taken along lines VII — VII thereof.

FIGS. 8a through 8g are operational views of a motion program mechanism employed in the printing system of FIG. 1.

Figure 1:
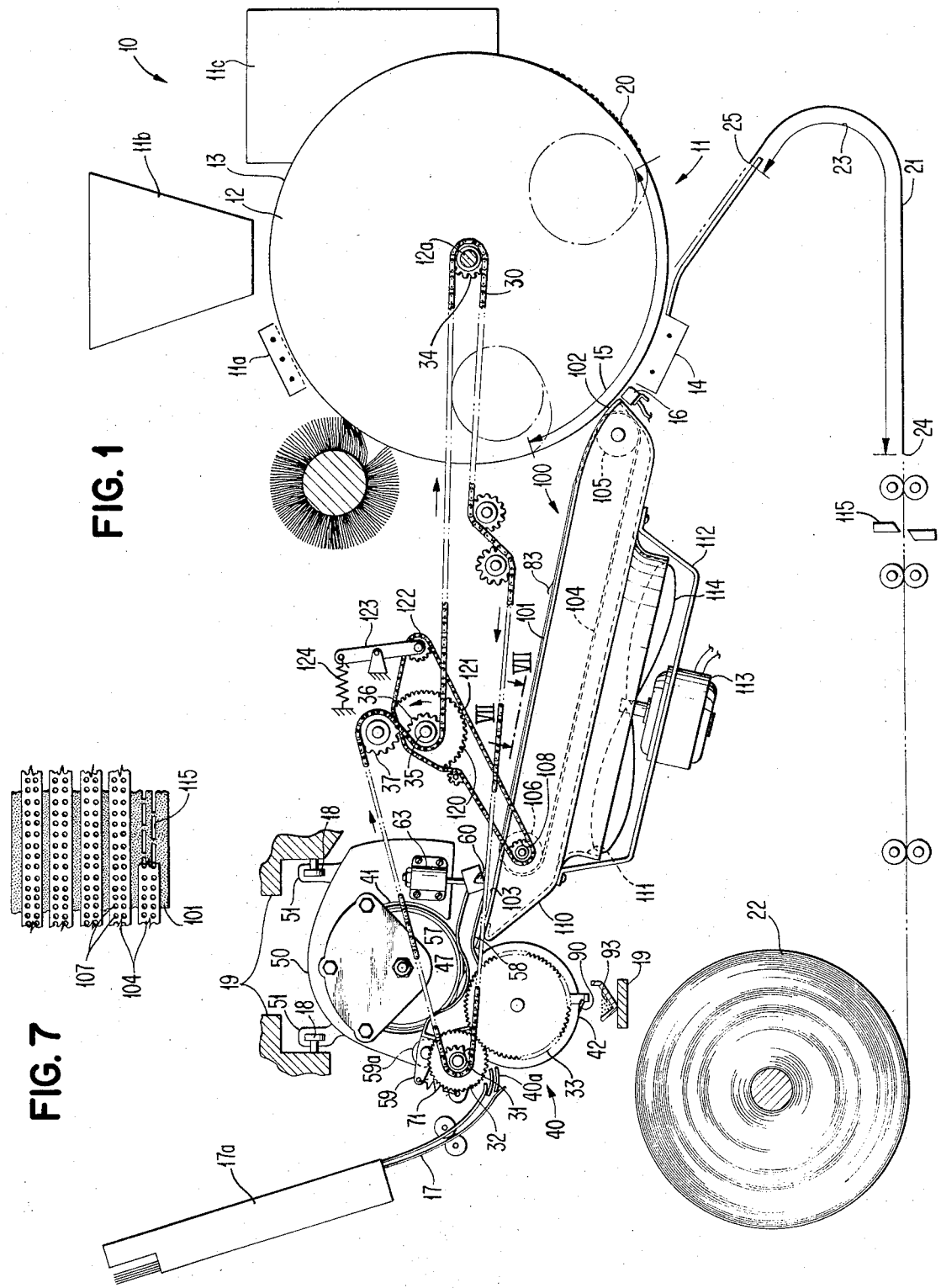
FIG. 1 is a side-elevational view of the major components of a printing system constructed in accordance with my invention.

Referring now more specifically to the drawings, in FIG. 1 there is shown an elevational cross-sectional view of a conventional xerographic printing system 10 having a copy generating apparatus 11 and a contact fixing station or roll fuser unit 40 constructed in accordance with my invention. The copy generating apparatus 11 preferably, but not necessarily, includes a motor driven image transfer drum 12 on which is developed a powder image 20 that is transferred to paper copy sheets 21 to provide output copy bearing the image 20 that is to be fixed. Typical copy generating apparatus is described in U. S. Pat. No. 3,588,242 and includes a photoconductive drum surface 13 that is charged by a corona device 11a, is imagewise discharged by an optical system 11b, is developed by a developing system 11c and transfers the powder image 20 by a transfer corona device 14 to the copy sheet 21. The optical system 11b may provide a scanning system whereby a flowing segmented image of a document is projected through a suitable lens and/or mirror system. Alternatively, the optical system could include an original text generating device such as a cathode ray tube. The copy generating apparatus 10 could also be a xeroprinting device wherein a permanent electrostatically differentiated image is mounted on the drum 12 and is repeatedly developed. Paper from a roll 22 is severed by a cutter device 11d into copy sheets 21 which are of at least a predetermined maximum and preferably constant length or dimension 23 in their transport direction.

As is typical of transfer machines of this type, only a portion of the drum surface 13 is employed for making copies and thus a small peripheral gap portion 15 is not used.

This portion of the drum surface passes under the optical station 11b during the time the document scanning system is restoring. Gap portion 15 may also include a discontinuity in the photoconductive surface where a replaceable photoconductor as described in aforesaid U. S. Pat. No. 3,588,242 is employed. Due to the length of gap 15 there will always exist at least a minimum inter-copy delay time between the delivery of the trailing edge 24 of one copy sheet 21 and thee leading edge 25 of the succeeding copy sheet 21.

Sheets 21 bearing unfixed images 20 are delivered from the transfer corona 14 at the peripheral linear speed of the drum surface 13. The copy sheets 21 are separated from the drum surface 13 by any suitable detack means 16 such as, for example, a vacuum creating device like that described in U. S. Pat. application Ser. No. 212,359 entitled "Sheet Removing apparatus" filed December 1971. Once separated from the surface 13, the unfixed copy sheet 21 is carried by a sheet controlling endless belt conveyor 100 to the fusing unit 40, out chute 40a supported by the fusing unit 40, into exit chute 17, and thence into an exit pocket 17a. As is best shown in FIG. 3, the fusing unit 40 is driven through a speed reduction motion transmission including a chain 30, sprocket 31, and transfer gears 32, and 33 from sprocket 34 (FIG. 1) on the drum shaft 12a such that the linear operating speed of the fusing unit 40 is a fixed reduced proportion of the speed of drum peripheral surface 13. Preferably this proportion is substantially the same as the proportion of the copy length 23 is to the copy length 23 plus the length of the inter-copy gap 15. This proportion causes the entire inter-copy time gap to be made available to increase fusing time. It also substantially eliminates all spacing between adjacent copy sheets 21 as they are presented to the roll fusing unit 30.

The chain 30 also supplies drum synchronized motion to a non-uniform sprocket pulley 120 which in turn drives a closed loop strand or chain 121 that is connected to the conveyor 100. The shape of sprocket pulley 120 provides a motion program that is synchronized with the rotation of drum 12 to cause the conveyor 100 to receive copy from the transfer corona 14 at substantially the same or slightly less speed than the drum surface 12 so as not to interfere in any way with the transfer operation by corona 14.

The paper path between the transfer corona 14 and the fusing unit 40 should be greater than the copy length 23 so that the same paper sheet 21 is not being driven at different speeds at the same time and thus offering the possibility of inducing smearing of the toned image at the transfer station. Once a copy sheet 21 has been completely delivered from the transfer corona 14, the sprocket pulley 120 can slow the conveyor 100 to substantially the same or somewhat less than the linear speed of the fusing unit 40. After delivering the leading edge 25 of the sheet 21 to the fusing unit 40, the conveyor 100 is again brought up to the speed of the drum 12 by sprocket 120 in preparation for receiving a further sheet 21 from the transfer corona 14. During the time that the conveyor 100 moves faster than the sheet 21 being fed through the fusing unit 40, the sheet simply slides thereon. Buckling is prevented by a holding force provided by a constant pressure vacuum plenum 110 over which the conveyor 100 travels. I prefer to operate the conveyor at slightly less than the linear operating speed of fixing unit 40 when introducing the sheet 21 thereto so that the sheet is placed under tension by the fusing unit 40 and is pulled from the conveyor 100 thus initiating a sliding contact therewith to better control the transistion to sliding contact between the conveyor 100 and sheet 21.

FUSING UNIT

The fusing unit 40 is more clearly shown in FIGS. 2–4 and includes a fusing roll couple including heated fusing roll 41 and an opposed non-heated backup roll 42. Both rolls 41 and 42 are carried by frame structure 50 having channel shaped tracks 51 that engage rollers 18 on the machine frame 19 to enable removal of the entire fusing unit 40 for either inspection or service. The fusing roll 41 has a thin, substantially rigid cylindrical wall 43, FIG. 3, made of a good heat conducting material such as aluminum and a surface 44 comprising a smooth thin layer 45 of a silicone elastomer such as General Electric RTV 60 having the properties of resistance to heat degradation, deformability under low pressure from the backup roll 42, and having a low surface free energy that exhibits a minimum adhesive tendency toward liquid or powder toner. The wall 43 of the fusing roll 22 has an axial length in excess of 14 inches so as to receive the lengthwise extent of legal size paper. Each end of wall 43 is closed by an insulating plate 41a which supports a bearing race 41b which in turn rotatably engages pin shaft 52 carriee by end plate 53 connected to the fuser frame 50. An elastomeric seal 41c provides a continous press fit between cylindrical wall 44 and plate 40a throughout a wide range of temperatures. A reflector 53a is mounted on the inside of plate 41a to more efficiently distribute heat from lamp 41d. The stationary pin shafts 52 also support a tungsten filament lamp 41d concentrically within the fusing roll 41 to provide heat to surface 44. A rapidly cooling extended surface shield 54, FIGS. 3 and 4, surrounds the heated roll 41 to keep the operator from directly touching the heated roll 41 when the fusing unit 40 is withdrawn from the machine for service.

The backup roll 42, FIGS. 2 and 3, has a relatively thick side wall 46 of good heat conducting material and internal rib structure 42a all of which may be formed as an extrusion to provide a substantially rigid roll with cooling air passages 42b therethrough. A thin coating 42c of a non-stick material such as polytetrafluoroethylene minimizes sticking of toner to the backup roll 42. When pressed against the fusing roll 41, the backup roll 42 forms a local curvature or nip 47 in the deformable layer 45 that is essentially congruent with the backup roll 42. Each end of the backup roll 42 carries a support shaft 55 that is received in a bearing 56 carried by cradle-like support arms 57. The support arms 57 are configured with curved sides 58 to avoid interference with the conveyor 100 as the fusing unit 40 is removed laterally from the machine 10. A yieldable support arm pivot connection 60 is supported by a spring 61 within a cage 63. Spring 61 is supported by an adjustable bushing 62 and is maintained in an adjustable state of precompression by nut 64. The cage 63 is fixed to the frame 50 of the fusing unit 40. The other end 59 of each of the support arms 57 carries a cam follower roll 59a that rides in engagement with a closing cam 70 that is rotatably carried by the fixing unit frame 50. A spring 71 connected between the frame 50 and the support arm end 54 constantly tends to open the nip 47 between the rolls 41 and 42.

Closing cam 70 has two primary operative positions as illustrated in full and phantom lines in FIG. 2. Motion for driving the backup roll 42 as well as the cam 70 is transmitted to drive shaft 72 through a severable connection 73 provided by a pair of spring biased dogs 73a that engage a complementary notch 73b when the fusing unit 40 is fully in place within the machine. Chain 30 thus provides rotary motion through drive gear 32 and drive gear 33 to backup roll shaft 55. Drum sprocket 34, sprocket 31, gear 32, and gear 33 are all sized to move the surface of the backup roll 23 at a fraction of the surface speed of drum 12. Preferably this fraction is the ratio of the length 23 of a copy sheet 21 to the circumference of drum 12 where the drum carries a single image area. The heated roll 41 is driven by friction from the backup roll 42. As also shown in FIG. 5, shaft 72 is also connected through friction clutch and positive acting jaw clutch 75 to the roll closing cam 70. Control arbor 76 of clutch 75 is slideably keyed to the shaft of cam 70 and includes a peripheral slot 76a that is engaged by control arm 80. A spring 81 normally holds arbor 76 out of engagement with input arbor 77. Solenoid 82 when energized displaces arm 80 to the position shown to couple arbors 76 and 77 and thereby deliver motion to cam 70. Cam 70 is rotated against spring 78 until the cam 70 engages stop 79 after closing the rolls 41 and 42. The friction clutch 74 continues to apply holding force to the cam 70 so long as clutch 75 is engaged.

Opening of clutch 75 frees the cam 70 to restore to its rest position under the load of the backup roll 42 and the force of restore spring 78. The basic circuitry for controlling the solenoid 82 to open and close the rolls 41 and 42 can involve simple OR logic as shown in FIG. 5. Switch 83 (see also FIG. 1) is located upstream of the fusing unit 40 a sufficient distance to allow time for the rolls 41 and 42 to close just prior to receiving the copy sheet leading edge 25. Switch 84 (see also FIG. 3) is located just downstream of the rolls 41 and 42 to enable quick opening of the rolls after fixing the last copy in a continuous stream. The solenoid 82 will be energized so long as either switch 83 or 84 is closed. If desired, a normally closed malfunction shut down switch 85 can be employed in the circuit to de-energize the solenoid 82 in response to sensing a paper jam or other malfunction. Of course more elaborate circuitry can be employed if desired. The roll couple thus remains closed so long as continuous copies are being made. There is no need to provide for opening and closing the rolls between successive copies within a run since the normal inter-copy gap 15 has been eliminated by the lower speed of the fusing unit 40. Should a paper jam or other malfunction cause the machine 10 to shut down, switch 85 opens and solenoid 82 is deactivated. The positive acting clutch 75 opens and the restore spring 78 returns the cam 70 to its starting position allowing the arm end 59 to move down and the backup roll 42 to open.

There is a tendency for toner to accumulate on the backup roll 42 for example from its minor contact with fusing roll 41 from contact with previously fixed copy which is passed through the roll couple for fixing an image on to its reverse side, and from loose toner carried by air within the machine to the backup roll 42. To remove this accumulated toner, a scraper 90 is provided, see FIGS. 1, 2 and 6. Preferably the scraper 90 includes a plurality of individually flexible spring finger blades 91 having sharp leading edges 92 that scrape the toner particles from the roll surface. Individual flexure of the blades 91 accommodates roll irregularity such as accumulated toner spots. A reservoir 93 (FIG. 1) is carried by the machine frame 19 to collect scrapings falling from the scraper 90.

COPY TRANSPORT CONVEYOR

The copy transport conveyor 100 is best shown in FIG. 1 and comprises a support table or path defining surface 101 that extends substantially the entire distances between the detack device 16 and the entrance to fusing unit 40. The table 101 includes a convex lead-in portion 102 that approaches the tangent to the drum 12 and smoothly curves to a substantially planar feed path for the majority of the table length. The downstream or output end of the table 101 includes a concave portion 103 (see also FIG. 3) that directs the leading edge 25 of the sheet 21 into the nip 47 off the rolls 41 and 42. The concave portion 103 causes the sheet 21 to curve slightly before contacting the fuser nip 47 and buckle into the table 101 where buckling is resisted rather than to buckle possibly away from the table 101 where control of the paper would be lost. A plurality of belts 104 are tracked around pulleys 105 and 106 near the upstream and downstream ends off the table 101. Beneath the conveyor table 101 is a box-like plenum 110 having a fairly large central opening 111 therein. A frame structure 112 supports an electric motor 113 which drives a propeller-like fan 114 in the opening 111 to create a relatively constant pressure, high volume source of slight-vacuum within the plenum 110. The table 101 contains a plurality of elongated openings 115 (see FIG. 1) that are aligned with holes 107 in the belts 104 by which vacuum is applied to the underside of a copy sheet 21 being transported by the belts 104. This vacuum provides a relatively constant, low normal force against the copy sheet 21 being transported by the belts 104. This normal force will hold paper flat on the belts 104 and establish sufficient yieldable traction for paper transport while permitting slippage of the paper on the belts 104 as must occur when copy is passing into the fixing unit 40 at a rate slower than the belts 104 are moving. The belts 104 ride on the surface of table 101 throughout the mid portion of its length. The downstream belt pulley 106 has a drive sprocket 111 attached to an end shaft thereof which is driven by the closed loop motion transmission chain 121 as best seen in FIG. 8a. Chain 121 is tracked around idler pulley 122 that is pivotly carried by a lever 123 yieldably biased by spring 124 to maintain tension on the chain 121. Pulley 122 is located between the point 109 where chain 121 leaves sprocket 108 and point 102a where the chain 121 is taken up by the pulley 120. The programmed motion drive sprocket pulley 120 engages the chain 121 through either a large radius high speed toothed periphery 125 or a small radius low speed toothed periphery 126. The sprocket pulley 120 receives constant angular motion on its input shaft 35 from sprocket 36 (see FIG. 1) guided by idler sprocket 37 about which passes chain 30.

Sprocket pulley 120 pulls chain 121 from idler roll 122 at a rate determined by the sprocket pulley radius at the point 120a, FIG. 8a, of entrance engagement.

The sprocket pulley 120 pays out chain 121 at a rate determined by the sprocket pulley radius at the point 120b of exit engagement. Since the radii at these points may differ, the chain 121 will be sometimes pulled faster than it is payed out and vice versa.

Spring 124 yields to accomodate these differences. Since the span of chain 121 between exit engagement point 120b and conveyor drive sprocket 108 cannot yield, its speed will determine the speed of conveyor belts 104. It is desired to achieve a relatively abrupt deceleration from high to low transport speed to minimize the required length of conveyor 100. Chain path control guide roller 127 assists this abruptness by forcing the chain 121 to remain substantially tangent to periphery 125 until just before the chain 121 becomes aligned with periphery 126. Preferably roller 127 is located close to periphery 104 and is positioned with respect to the common tangent 128 to periphery 126 and sprocket 108 such that the span of chain 121 is always deflected inwardly thereby.

OPERATION

As sheet 21 approaches transfer station 14, as shown in FIG. 1, the sprocket 120, (see also FIG. 8a) is just about to begin its slow drive movement. As sprocket 120 moves to the position of FIG. 8b, the chain 121 is payed out at a rate determined by the radius of periphery 126. Since the chain 121 is being taken up by the high speed periphery 125, lever 123 will begin pivot clockwise against spring 124. This motion continues through the position of FIG. 8c with progressive pivoting of lever 123 until the position of FIG. 8d is reached. At this time the leading edge 25 of copy sheet 21, (see FIG. 1) has reached detack device 16 and the sprocket 120 has rotated sufficiently so that chain 121 is being payed out at the speed of sprocket periphery 125. As mentioned above, this speed is preferably equal to or slightly slower than the peripheral speed of the drum 12 to insure no interference with the transfer process. The copy sheet 21 is held by vacuum onto the belts 104 and is carried upwardly toward the unit 40. When switch 83 (FIGS. 1 and 5) is contacted, electromagnet 82 is activated to initiate closing of the roll 42 against roll 41.

The sprocket 120 will continue the high speed pay out and take-up of chain 121 through the position of FIG. 8e, during which time the lever 123 remains substantially stationary. Continued high speed pay out as shown in FIG. 8f and 8g occurs with a low speed take-up to allow lever 123 to be returned counter-clockwise by spring 124. At the time the copy sheet trailing edge 24 leaves transfer station 14, the sprocket 120 has returned to the position shown in FIGS. 1 and 8a. Rotation from this position rapidly reduces the pay out rate to that of periphery 126. This deceleration will be complete as the parts again move to the position of FIG. 8b and the copy sheet leading edge 25 enters the nip 47 of the fusing unit 40. The output speed generated by low speed periphery 126 is equal to or preferably slightly less than the drive speed of back-up roll 42, the sheet 21 will be pulled from the belt 104 with a slight amount of slipping. The sheet 21 is held flat by the applied vacuum.

If a second copy is being made, its leading edge 25 will reach transfer station 14 long before the first copy sheet has passed the fusing unit 40. Acceleration of the conveyor 100 by the sprocket 120 moving to the position of FIG. 8d causes the belts 104 to slip beneath the first copy which is still in the fusing unit 40. The vacuum applied beneath the table 103 holds the first copy sheet flat as the belts 104 slide beneath it. If the speed of the fusing unit 40 is proportional to the speed of the drum 12 as the copy sheet length 23 and the inter-copy gap 15 then the leading edge 25 of the second copy sheet will follow immediately the trailing edge of the first copy sheet into the fusing unit 40. Thus, there is no need to separate the rolls 41 and 42 between the successive copies.

As the last copy sheet 21 in a succession is passing through the fusing unit 40, its trailing edge 24 will uncover switch 83 (FIGS. 1 and 5). Roll 42 will not be released, however, since the sheet is at this time over switch 84 (FIGS. 3 and 5). Only after the trailing edge 24 of the last copy sheet 21 has uncovered switch 83 will electromagnet 82 be deenergized to open clutch 76 and allow springs 71 and 78 to lower the backup roll 42.

ALTERNATIVE PROGRAMMING MECHANISM

Figure 10:
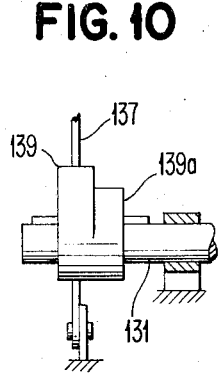
FIG. 10 is a fragmental front elevational view of a portion of the alternate motion program mechanism of FIG. 9 taken along lines X — X thereof.
Figure 9:
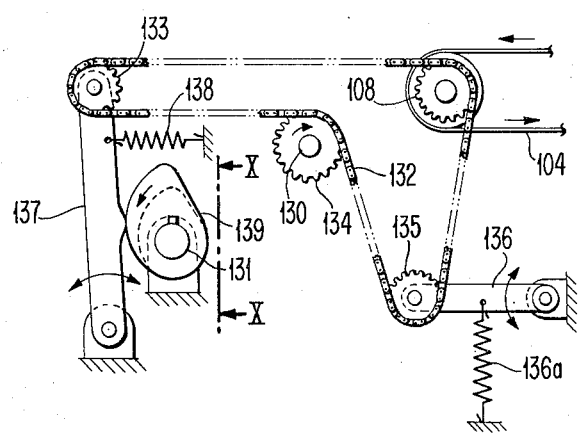
FIG. 9 is a fragmental side view of an alternative motion program mechanism that can be employed in the printing system of FIG. 1.
Figure 11:
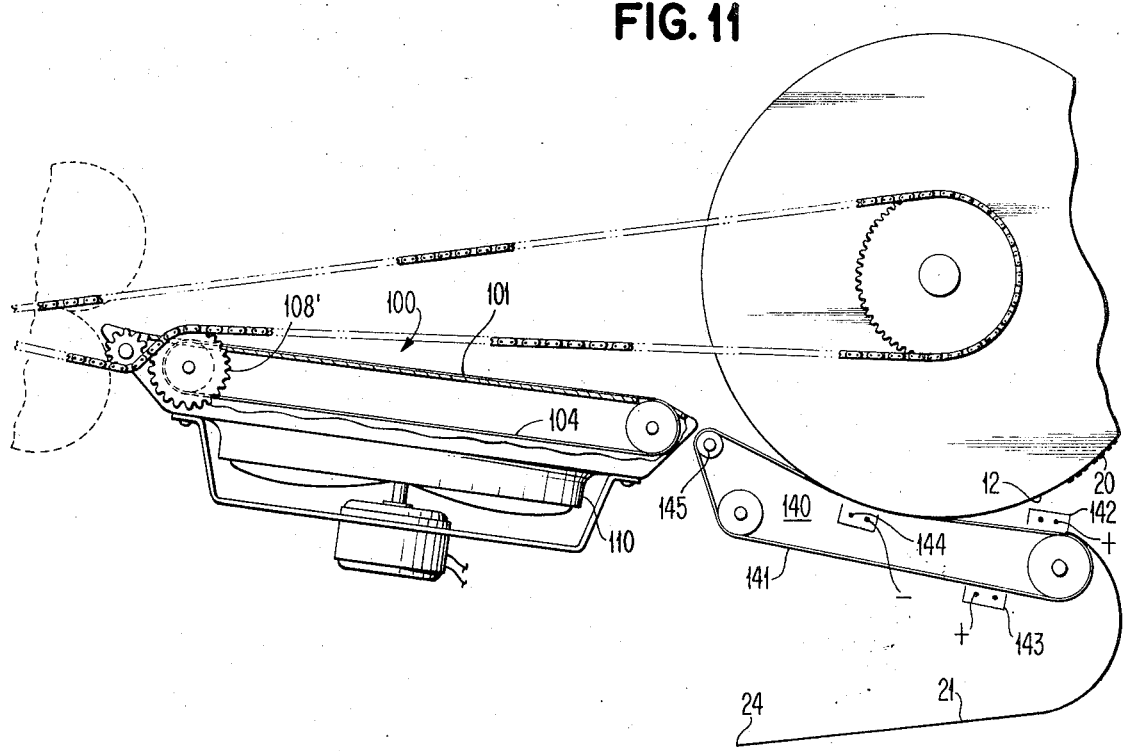
FIG. 11 is a side elevational cross-sectional view of the major elements of a printing system employing a non-programmed sheet conveyor in combination with an electrostatic transfer conveyor.

FIG. 9 shows an alternative mechanism for programming the speed of belts 104 in place of the sprocket 120. Constant angular motion is delivered by means not shown from the drum 12 (FIG. 1) to shafts 130 and 131. Closed loop chain or strand 132 is tracked around conveyor drive sprocket 108, speed varying sprocket 133, primary motion input sprocket 134, and idler sprocket 135. Idler sprocket 135 is mounted on pivoted arm 136 and is biased by spring 136a to provide the strand tensioning function similar to that provided by sprocket 122 in FIG. 1. Speed varying sprocket 133 is mounted on pivoted arm 137 and is biased by spring 138a against the external surface of a program cam 139 on shaft 131. The cam 139 rotates in synchronism with the drum 12 such that a complete cam rotation corresponds to rotation of the drum 12 through a complete copy cycle including passage of the inter-copy gap portion 15, see FIG. 1. If desired, an alternate program cam generated by the use of cam 139a, see FIG. 10, to accomodate processing copy sheets of either of two lengths. Copy length selection mechanism not shown slides cams 139 and 139a along keyed shaft 131 into alternate alignment with pivoted arm 137.

In operation, the speed of conveyor belts 104 is determined primarily by the speed of the copy drum 12 as delivered through shaft 130 to the primary input sprocket 134. Cam 139 or 139a sequentially adds and subtracts motion to the basic motion input from sprocket 134. The belts 104 thus will be driven faster as arm 137 is driven outwardly by cam 139. This motion will be accompanied by upward movement of the tensioning arm 134. As the cam 139 passes its high point, arm 137 will rapidly move inwardly to subtract motion from that applied by sprocket 134, thereby reducing the speed of the belts 104. It will be appreciated by those skilled in the art that an advantage of this motion variation system is the freedom afforded in the design of cam 139 for providing exactly the program desired.

FIRST NON PROGRAMMED CONVEYOR

An alternative approach to the above described programmed conveyor involves the use of a conveyor operating at a fixed transport speed wherein the paper is decelerated by impacting the slower moving fuser rolls in an unprogrammed manner. The curvature 103 of the table 101 and the vacuum applied by plenum 110 tends to hold down the sheet 21 as its leading edge 25 slams into the slower moving fuser rolls 41. While this approach has the mechanical advantage of ultra-simplicity, it would be anticipated by those skilled in the art that the design parameters affected by longitudinal shock on the unfused copy become much more critical. However, in practice the anticipated negative effects of the attendant high deceleration have not been obtained in this mode with a non-programmed conveyor which is running at a velocity of 20 in/sec in conjunction with a fuser with a peripheral roll velocity of 11.5 in/sec.

SECOND NON PROGRAMMED CONVEYOR

FIG. 9 shows a copy printing system like that of FIG. 1 but employing a transfer station 140 that maintains positive control over the copy sheet 21 during the transfer operation. Transfer station 140 includes a conveyor transport belt 141 made of a suitable dielectric material, e.g., polyethylene terephthalate. A corona discharge unit 142 electrostatically tacks the copy sheet 21 to the polyethylene terephthalate belt 141 with a relatively high holding force. Corona unit 143 eliminates surface charge that collects on belt 141. The copy sheet thus is conveyed into contact with the drum 12 by the belt 141. A transfer corona charges the inner surface of belt 141 to create an electrostatic field with the grounded metallic backing of drum 12 such that the positively charged toner image 20 is transferred to the copy sheet 21. The belt 141 conveys the copy sheet away from drum 12 to a separation point provided by an idler roller 145 of relatively small radius. The copy sheet 21 thus separates from the belt 141 and moves on to the table 101 of the conveyor 100. Due to the high tacking force between the copy sheet 21 onto the belt 141 downstream of the transfer corona 144, frictional interference with the copy sheet 21 by the conveyor table 101 does not interfere with the transfer operation at corona 144. Accordingly, with a transfer mechanism of this type sprocket 108' is preferably sized to run the conveyor belts 104 continuously at substantially the slower speed of the fusing unit 40. Thus, the copy sheet 21 projected by conveyor 141 onto the table 101 is held against belts 104 by the vacuum created in the plenum 110 as previously described. Since the belts 104 are moving more slowly than the sheets emerging from conveyor 141 slippage will occur therebetween until the trailing edge 24 of the copy sheet 21 has been released by the conveyor 141. The belts 104 thus will feed the sheet 21 to the fusing unit 40 at substantially the speed of the fuser.

It will be appreciated by those skilled in the art that I have invented a printing system employing a fusing station that is operated at a slower through-put speed than copy is generated and that this system is particularly beneficial in enhancing and optimizing the use of a heated roll fuser where the heated roll employs a deformable surface. While some embodiments I have disclosed employ a programmed motion conveyor to insure maximum copy path control, I have also disclosed alternative embodiments that are capable of achieving the fuser operation enhancements results according to the broader aspects of my invention. Since various modifications deletions and additions to the specific illustrative structural embodiment shown will be apparent to those skilled in the art, it is to be understood that the subject matter sought to be patented is to be defined solely by the appended claims.

I claim:

1. A printing system including copy generating mechanism for delivering successive cut copy sheets bearing images to be fixed at a first predetermined linear speed and separated by at least a predetermined minimum inter-copy gap time, said copy sheets having at least a predetermined maximum dimension between leading and trailing edges thereof, contact fixing mechanism including a heated surface supported for movement in contact with said images to be fixed, wherein the improvement comprises:

means for moving said heated surface at a second predetermined linear speed that is less than said first predetermined linear speed, conveyor means positioned operatively between said copy generating mechanism and said contact fixing mechanism for transporting said copy sheets along a path therebetween, and programmed drive means synchronized with said copy generating mechanism for driving said conveyor means alternately at a first transport speed that is at least near said first predetermined linear speed and at a second transport speed that is at least near said second predetermined linear speed.

2. A printing system as defined in claim 1 wherein:
   the path of cut sheet copy travel between said copy generating mechanism and said contact fixing mechanism is greater than said copy sheet dimension but less than twice said copy sheet dimension, said conveyor means yeildingly transports said copy sheet, and said programmed drive means drives said conveyor means at speeds in excess of said second predetermined linear speed after delivering the leading edge of a copy sheet into said contact fixing mechanism and prior to delivery of the trailing edge thereof to said contact fixing mechanism.

3. A printing system as defined in claim 1 wherein:
   said contact fixing mechanism is located above the delivery of copy sheets by said copy generating mechanism, and said conveyor means comprises endless belt means extending between said copy generating mechanism and said contact fixing mechanism and vacuum means for yieldably holding said copy sheets to said endless belt means.

4. A printing system as defined in claim 1 wherein:
   said first and second transport speeds are substantially equal to said first and second linear speeds, and said programmed drive means is timed to drive said conveyor means at said first transport speed during substantially the entire time a copy sheet is being delivered from said copy generating means and at said second transport speed at least during the time that the leading edge of a copy sheet is delivered to said contact fixing mechanism.

5. A printing system as defined in claim 1 wherein said programmed drive means comprises a source of uniform angular motion, a closed loop motion transmission strand connected to said conveyor means, and pulley means connected to said closed loop motion transmission and to said source of uniform angular motion, said pulley means having a periphery configured to convert said uniform angular motion into varied linear motion of said closed loop motion transmission.

6. A printing system as defined in claim 5 wherein said pulley means periphery comprises a first portion of relatively large radius for paying out and taking in said strand at a relatively high speed, and a second portion of relatively small radius for paying out and taking in said strand at a relatively low speed, and said programmed drive means further comprising yieldable means engaging said strand between the connection of said strand to said conveyor means and the point that said strand is taken up by said pulley means for maintaining tension in said strand during different pay out and take up thereof by said pulley means;

whereby differences in the speed of strand pay out by said pulley means governs the speed of said conveyor means.

7. A printing system as defined in claim 6 further comprising:

a strand path control guide positioned adjacent the point of strand pay out by said pulley means for maintaining said strand in effective tangentical engagement with said pulley means large radius periphery substantially until said small radius portion thereof begins to pay out said strand.

8. A printing system including copy generating mechanism for delivering successive cut copy sheets bearing images to be fixed at a first pre-determined linear speed and separated by at least a pre-determined minimum inter-copy gap time, wherein the improvement comprises:

a fusing roll couple including a fusing roll for contacting said image to be fixed and having a deformable surface layer, said roll couple further including a backup roll and support means for pressing said backup roll and said fusing roll together whereby said surface layer of said fusing roll is deformed by said backup roll to develop a local surface curvature that is essentially congruent with said backup roll surface, and means for driving said roll couple at a peripheral linear speed that is substantially less than said first linear speed.

9. The printing system as defined in claim 8 wherein the improvement further comprises:

conveyor means positioned operatively between said copy generating mechanism and said fusing roll couple for transportiong said copy sheet therebetween, and programmed drive means synchronized with said copy generating mechanism for driving said conveyor means alternately at a first transport speed that is at least near said first pre-determined linear speed and at a second transport speed that is at least near said peripheral linear speed.

10. A printing system including copy generating mechanism for delivering successive cut copy sheets bearing images to be fixed, said copy sheets being of a pre-determined dimension between leading and trailing edges thereof and being delivered at a first pre-determined linear speed and being separated by a pre-determined minimum inter-copy gap length, a fusing roll couple spaced from said copy generating mechanism for receiving copies generated thereby, said fusing roll couple having a heated roll supported for movement in contact with said images to be fixed and a non-heated backup roll supported for pressing said copy sheets against said heated roll, and means for moving the rolls of said couple at a second pre-determined linear speed that is less than and proportioned to said first pre-determined linear speed in substantially the same ratio as said pre-determined dimension is to the sum of said pre-determined dimension and said minimum inter-copy gap length.

11. A printing system as defined in claim 10 further including conveyor means positioned operatively between said copy generating mechanism and said fusing roll couple for transporting said copy sheets therebetween, and programmed drive means synchronized with said copy generating mechanism for driving said conveyor means alternately at a first transport speed that is at least near said first pre-determined linear speed and at a second transport speed that is at least near said second pre-determined linear speed.

12. A printing system including copy generating mechanism, conveyor means tightly engaging cut sheet copies bearing images to be fixed produced by said copy generating means to positively transport said copy sheets at a first predetermined linear speed, said copy sheets being separated by at least a predetermined minimum inter-copy gap time and having at least a predetermined maximum dimension between leading and trailing edges thereof, and contact fixing mechanism including a heated surface supported for movement in contact with said images to be fixed, wherein the improvement comprises:

means for moving said heated surface at a second predetermined linear speed that is less than said first predetermined linear speed, and sheet control means positioned operatively between said copy generating mechanism and said contact fixing mechanism for maintaining said copy sheets in a controlled path therebetween, said sheet control means comprising:

a path defining surface having a plurality of openings therethrough and being positioned to supportingly receive copy sheets from said conveyor means, a plenum positioned adjacent said path defining surface and in flow communication with said openings therethrough, and fan means for creating a slight vacuum in said plenum whereby copy sheets are lightly urged toward said path defining surface, whereby a copy sheet delivered by said conveyor means onto said path defining surface slides on said path defining surface while being held thereagainst by said slight vacuum.

13. A printing system as defined in claim 12 wherein said path defining surface further comprises:

further conveyor means, and means for driving said further conveyor means at a linear speed that is substantially less than said first predetermined linear speed.

14. A printing system as defined in claim 12 wherein said path defining surface further comprises:

further conveyor means, and means for driving said further conveyor means at a linear speed that is substantially equal to said second predetermined linear speed.

* * * * *